US007989103B2

(12) United States Patent
Kepler et al.

(10) Patent No.: US 7,989,103 B2
(45) Date of Patent: Aug. 2, 2011

(54) COMPOSITE BATTERY SEPARATOR FILM AND METHOD OF MAKING SAME

(75) Inventors: Keith Douglas Kepler, Belmont, CA (US); Yu Wang, Foster City, CA (US)

(73) Assignee: Farasis Energy, Inc., Hayward, CA (US)

( * ) Notice: Subject to any disclaimer, the term of this patent is extended or adjusted under 35 U.S.C. 154(b) by 1234 days.

(21) Appl. No.: 11/491,218

(22) Filed: Jul. 20, 2006

(65) Prior Publication Data

US 2007/0018141 A1 Jan. 25, 2007

Related U.S. Application Data

(60) Provisional application No. 60/701,249, filed on Jul. 20, 2005.

(51) Int. Cl.
*H01M 2/16* (2006.01)
*H01M 2/18* (2006.01)

(52) U.S. Cl. ........ 429/142; 429/249; 429/251; 429/252; 429/254

(58) Field of Classification Search ........................ None
See application file for complete search history.

(56) References Cited

U.S. PATENT DOCUMENTS

| | | | | |
|---|---|---|---|---|
| 6,148,503 | A | 11/2000 | Delnick et al. | |
| 6,228,516 | B1 | 5/2001 | Denton | |
| 7,321,012 | B2 * | 1/2008 | Sotzing | 525/417 |
| 2004/0137331 | A1 * | 7/2004 | Han et al. | 429/247 |

FOREIGN PATENT DOCUMENTS

WO WO 03/100954 A2 12/2003

OTHER PUBLICATIONS

Thomas-Alyea, K. E.; Modeling the Behavior or Electroactive Polymers for Overcharge Protection . . . , Journal of The Electrochemical Society, vol. 151, Iss. 4, 2004, p. A509.
Chen, G.; Overcharge Protection for Rechargeable Lithium Batteries Using Electroactive Polymers, Electrochemical and Solid-State Letters, vol. 7, Iss. 2, 2004, p. A23.
Chen, G.; Overcharge Protection for High Voltage Lithium Cells Using Two Electroactive Polymers, Electrochemical and Solid-State Letters, vol. 9, Iss. 1, 2006, p. A24.
Xiao, L. F.; A composite polymer membrane with reversible overcharge protection mechanism for lithium ion batteries, Electrochemistry Communications, vol. 7, 2005, p. 589.
PCT Search Report & Op., (issued Aug. 30, 2007 for PCT/US06/28416).

* cited by examiner

*Primary Examiner* — Jonathan Crepeau
(74) *Attorney, Agent, or Firm* — James Cai; Schein & Cai LLP

(57) ABSTRACT

A microporous separator film for electrochemical cells and a method of making such films is disclosed. The microporous separator film includes an intimate mixture of an electrically insulating matrix phase and a self-switching voltage activated conductive phase, wherein the voltage activated conductive phase provides a plurality of conductive paths from a first face of the microporous separator film to a second face of the microporous separator film. The method for making the composite microporous separator film includes the steps of forming an intimate mixture of at least an insulating matrix phase and a self-switching voltage activated phase, forming a film from the mixture, and generating pores within the film.

10 Claims, 7 Drawing Sheets

COMPOSITE BATTERY SEPARATOR FILM AND METHOD OF MAKING SAME

RELATED APPLICATIONS

This patent claims the benefit of Provisional Patent Application Ser. No. 60/701,249, filed Jul. 20, 2005, the disclosure of which is herein incorporated by reference in its entirety.

FEDERALLY SPONSORED RESEARCH

Not Applicable

SEQUENCE LISTING OR PROGRAM

Not Applicable

FIELD OF THE INVENTION

The present invention relates to micro-porous films suitable for use as a separator for electrochemical cells and the methods for making such films. More particularly, this invention relates to composite micro-porous films suitable for use as improved bypass separators in non-aqueous electrochemical cells wherein the separator provides a reversible voltage activated current bypass for the prevention of cell overcharge or over-discharge.

BACKGROUND OF THE INVENTION

As the demand for portability of more and more advanced electronic devices and applications increases, there is a growing need for higher energy and power density energy storage devices. Rechargeable batteries based on Li-ion technology have been very successful at meeting this demand, particularly by penetrating high-end consumer electronic markets to replace lower energy density Ni—Cd and Ni-MH rechargeable batteries. Currently, worldwide annual production of Li-ion rechargeable batteries exceeds 2 billion cells. Lithium ion batteries, in general, are made using a transition metal oxide positive cathode material and a carbon based negative anode material with a micro-porous polyolefin separator between the electrodes. The majority of Li-ion cells (more than 99%) produced today are small size and low capacity cylindrical and prismatic cells (less than 2.5 Ah) though Li-ion batteries are also an attractive technology for emerging larger size, high capacity and high power rechargeable battery applications within the transportation, telecommunication and military markets.

While Li-ion cells offer the greatest rechargeable energy density on the market, they are also very sensitive to the voltage range within which they are cycled, which often limits the applications in which they can be used. In particular, Li-ion cells that are charged beyond a critical upper voltage limit can suffer degraded cycle life performance due to lithium plating at the anode and increases in impedance of the cathode. In the worst overcharge situations, shorts can form in the cell or the cell may suffer from thermal runaway leading to catastrophic failure, venting and explosions. Manufacturers are able to minimize the safety risk of small cells by incorporating expensive external and internal protection devices such as an electronic protection circuit, a disconnect disc, and a polymeric positive-temperature-coefficient resistor (PTC). Unfortunately, for larger cells with greater stored energy, and systems that require high currents, the same types of safety devices generally cannot provide sufficient system wide protection and scaling them up is often prohibitively expensive.

One of the best mechanisms for improving the safety of large cells is the use of a reversible voltage-activated bypass mechanism. Such a mechanism prevents the cell from being charged above (or below) a specific voltage by bypassing the excess charging (or discharging) current around the cell electrodes through a secondary low resistance circuit. Thus the cell electrodes can be prevented from charging (or discharging) outside of the voltage range within which they remain stable enough to reversibly cycle well and are not susceptible to excess heat generation, thermal runaway or catastrophic explosions. Because this mechanism is specifically triggered by the cell voltage and is reversible, it addresses many of the most difficult safety issues of a Li-ion cell by directly preventing cell overcharge and allowing for easier cell balancing in multi-cell packs. For current commercial systems an electronic circuit is used to prevent cell overcharge and to control cell balancing in packs. However, these devices are expensive and are not sufficient to guarantee cell safety and life. Providing the same protection internal to the individual cells is highly desirable. One approach that has had some success is the use of an electrolyte additive compound referred to as a redox shuttle. A redox shuttle acts as an electron shuttle between the anode and cathode of the cell at a specific onset voltage determined by the oxidation voltage of the additive. A redox shuttle provides a voltage activated short within the cell. A number of compounds have been proposed as redox shuttles, though their long-term stability and capability of handling high current densities is often limited.

As disclosed in U.S. Pat. No. 6,228,516, another concept for a reversible internal cell bypass is to use a self-switching voltage activated conductive material to create a bypass circuit. In one embodiment of this concept it was proposed that a self-switching material such as a voltage activated conductive polymer (VACP) be used to directly connect the anode and cathode electrodes. A VACP is a polymer material that can reversibly switch from an insulating state to an electrically conductive state upon oxidation and/or reduction. When the self-switching VACP based material becomes conductive above a certain cell voltage, an electrically conductive path is created between the anode and cathode and the cell is effectively shorted, preventing further increases in the cell voltage. The mechanism can also work for over-discharged cells. When the cell voltage falls back within the normal operation range the voltage activated conductive polymer again becomes insulating, and the cell operates in a normal fashion.

A version of this concept was recently demonstrated and the results reported in *Electrochemical and Solid State Letters,* 2004, 7(2), A23-26. A self-switching bypass structure for a Li-ion cell was made by coating a voltage activated conductive polymer (VACP), poly(3-butylthiophene) (P3BT), onto a conventional micro-porous polyethylene separator. By their method, the VACP is dissolved in a solvent such as chloroform to form a low viscosity solution. The solution is coated on both sides of a commercial PE or PP micro-porous separator (Celgard 2500). The solution flows into and through the preexisting pores of the polyolefin separator. When the chloroform evaporates it leaves behind a film of VACP on the surface of the separator and a network of solid VACP that has penetrated the existing pores of the separator to connect the two, coated faces of the separator. The use and effect of the VACP coated separator is similar to a standard external electronic bypass circuit though potentially less expensive and more responsive to overcharge conditions. A Li-ion cell was made using a standard $LiMn_2O_4$ cathode and Carbon anode laminates with the VACP coated separator sandwiched in between. The VACP coated separator became electrically conductive to generate a short between the anode and cathode electrodes when the cell voltage exceeded the conductive onset voltage of the VACP material, in this case ~3.4 V. Thus the cell could not be charged beyond this point, preventing cell overcharge or potentially allowing for cell balancing in strings of cells. In this concept demonstration, the maximum bypass current achieved was ~0.2 $mA/cm^2$, above which the cell voltage would continue to rise.

Prior to coating with the VACP conductive polymer to make a bypass capable separator, the conventional polyethylene (PE) and polypropylene (PP) separators are typically manufactured using a two-step process. The first step is to form a polymer film from the polyolefin material, and the second is to generate pores in the polymer film. The initial polymer film is produced for example by one of two processes: 1) Melt-extrusion through a die, such as T-die, or 2) Blown-film melt-extrusion through a die with an annular shape. The generation of micro-scale pores in these polymer films is mainly done using one of the following three processes: 1) dry-stretch process, 2) wet-extraction process or 3) particle stretch process. To produce the popular tri-layer polypropylene/polyethylene/polypropylene (PP/PE/PP) separator, three common processes are currently used: 1) Producing three individual porous films such as PP, PE and PP followed by lamination, 2) Producing three individual non-porous films followed by lamination and then generating micro-scale pores using one of the pore generating processes listed above, or 3) Co-extruding the three films together and again generating micro-scale pores using one of the pore generating processes listed above. Although all of these processes are somewhat different from each other, each of them is used to produce separators that are widely used in commercial Li-ion battery products and are suitable for making a bypass capable separator by utilizing a subsequent coating method to apply a VACP layer onto the separator.

The current state of the art bypass separators, wherein a conventional separator is coated with a solution of VACP, suffers from a number of problems that are detrimental to the utility of the bypass separator in an electrochemical cell. For example, the coating process necessarily clogs the pores of the separator with the VACP phase to provide an electrical current path from one face of the separator to the other. The presence of the VACP material in the separator pores leads to a higher cell impedance and lower power density of the cell. Reducing the amount of VACP present in the pores to minimize this effect in turn reduces the maximum bypass current density that the bypass separator can handle. In other words, the cross-sectional area of the conductive phase path from one face of the separator to the other face of the separator is generally quite low and the resulting impedance of the conductive path is quite high. Another issue is that the coating process results in the bulk of the VACP being present on the surface of the two faces of the separator film where it contributes very little to the current bypass capability of the separator. Because VACP materials are typically more expensive than the materials used to make the separator, it is preferred that the amount of the VACP material be minimized.

The coating process used to make the current state of the art bypass separators itself has many limitations. A major limitation with the coating process is that the VACP phase must be soluble in a solvent that can be used to coat the separator. Unfortunately, the low molecular weight VACP materials that are soluble and can be coated are often soluble or semi-soluble in the electrochemical cell electrolyte, greatly limiting their stability and long term life in a real cell. Furthermore, the additional coating process may add significant cost to the separator due to the equipment and time required to coat the separator and due to the use of large amounts of solvents needed.

While the current approach of utilizing a conventional Li-ion separator coated with a layer of VACP as an internal electrochemical cell, voltage-activated current bypass device is promising, there are still numerous performance, cost, engineering, stability and processing problems with such a bypass separator and with the current method and materials for making such a separator. Accordingly there exists a need for an improved bypass separator and the methods for its manufacture.

SUMMARY OF THE INVENTION

The present invention provides composite microporous films suitable for use as separators for electrochemical cells and the methods for making such films. More particularly, this invention relates to composite micro-porous films suitable for use as bypass separators in non-aqueous cells wherein the separator provides a reversible voltage activated current bypass for the prevention of cell overcharge or over-discharge.

In one aspect of the invention, the microporous film comprises an intimate mixture of a self-switching voltage activated conductive phase and an insulating matrix phase. In a preferred embodiment of the invention the matrix phase is a polyolefin material and the self-switching voltage activated conductive phase comprises a voltage activated conductive polymer. The structure of the composite separator of this invention is such that the voltage activated conductive phase provides a number of independent continuous paths not associated with the pores of the film, from a first face of the separator to a second face of the separator. The independent paths can conduct electrical current from the first face of the separator to the second face when the voltage activated conductive phase is in the conductive state. The composite microporous separator of this invention can preferably be used in non-aqueous electrochemical cells, such as Li-ion cells or electrochemical capacitors, to provide a voltage activated reversible current bypass mechanism for the prevention of cell overcharge and over-discharge and to provide a method of maintaining cell balance within a string of cells.

In another aspect of the invention, a method for making the composite micro-porous bypass separator includes mixing the voltage activated conductive phase into the matrix phase prior to forming the composite microporous film. The method is compatible with conventional methods for making microporous separator films for non-aqueous cells and does not involve an additional VACP coating step. The method may begin with dry mixing the two phases, mixing them in a melt, or in a solution. The mixture may also contain a pore-forming component for later extraction. The mixture may be extruded or cast to form an initial film. The initial film may then be stretched to the desired thickness. Pores may be formed in the film by extraction of the pore-forming component or by dry stretching the film. The film may be further annealed and processed to produce the final bypass separator material.

Additional advantages of the invention will become readily apparent to those skilled in the art from the following detailed description, wherein only the preferred embodiments of the invention are shown and described, simply by way of illustration of the best mode contemplated for carrying out the invention. As will be realized, the invention is capable of other and different embodiments, and its details are capable of modifications in various obvious respects, all without departing from the invention. Accordingly, the drawings and description are to be regarded as illustrative in nature and not as restrictive.

DETAILED DESCRIPTION OF THE INVENTION

The present invention relates to new composite microporous films suitable for use as a bypass separator in electrochemical cells and the methods for making such films. The bypass separator of this invention comprises an intimate mixture of a self-switching voltage activated conductive phase and an insulating matrix phase. For the purposes of this invention the voltage activated conductive phase may include any number of materials that can reversibly switch from an electrically insulating to an electrically conductive state based on the voltage applied to the material. Some common examples of voltage activated conductive phase materials that may be suitable include conducting polymers such as polyaniline, polythiophene, polypyrrole, polyphenylene, polyacetylene, poly(phenylene vinylene), polyfluorene, or semiconducting materials such as silicon, gallium or germanium, diamond, GaP, GaAs, and SiC. The matrix phase of this invention may include a number of electrically insulating materials such as the polyolefins, polypropylene and polyethylene, polyvinylidene fluoride, cellulose based materials or mixtures thereof. The amount of voltage activated conductive polymer in the bypass separator of the invention preferably ranges from 0.01% to 50% and more preferably from 0.01% to 20%.

Figure 1:
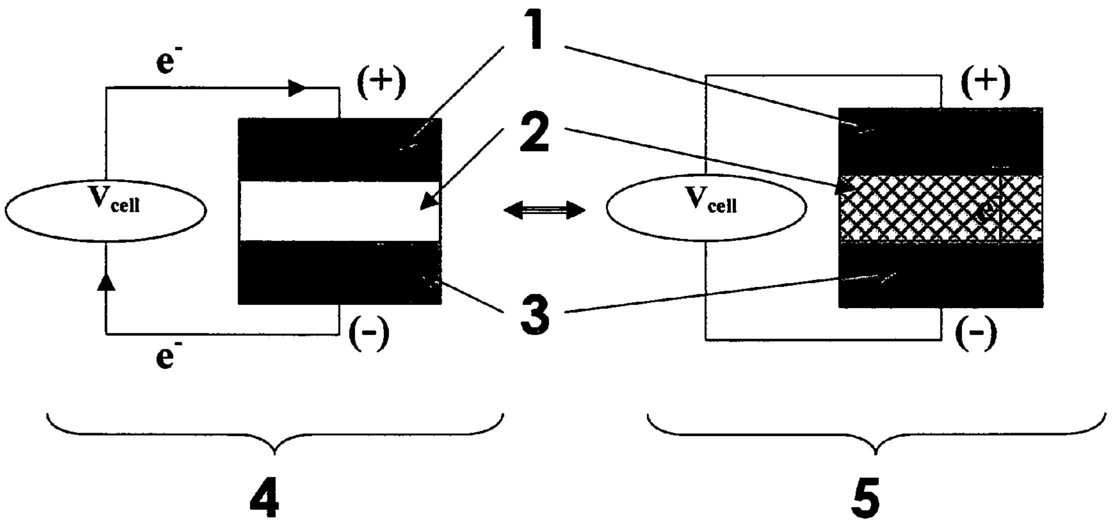
FIG. 1 is a schematic illustration of a cell using the composite bypass separator in accordance with the invention and illustrating the reversible transition from an insulating to a conductive state and the effect on the current path.

The composite microporous separator of this invention may be used in non-aqueous electrochemical cells, such as Li-ion cells or electrochemical capacitors, to provide a voltage activated reversible current bypass mechanism for the prevention of cell overcharge and over-discharge and to provide a method of maintaining cell balance within a string of cells. Before describing the details of the bypass separator of this invention it is useful to consider how it will be used in an electrochemical cell. FIG. 1 illustrates how the bypass separator of this invention may be utilized in a typical Li-ion cell. The cell comprises a cathode electrode 1, an anode electrode 3 and a bypass separator 2 in contact with both electrodes. The bypass separator can reversibly switch between an insulating state 4 and a conductive state 5 depending on the voltage applied to the cell. Below an onset voltage, the bypass separator, 2, is insulating and the cell behaves normally. Above the onset voltage, the bypass separator 2 becomes conductive allowing current to pass directly from the anode 3, through the conductive phase of the bypass separator 2, to the cathode 1, thus shorting the cell. The process is reversible and the bypass separator 2 becomes insulating once the voltage drops below the onset voltage, allowing the cell to operate normally again. A similar process may occur if the voltage falls below a certain range.

The reversible transition of the bypass separator from the insulating to the conductive state is determined by the properties of the voltage activated conductive phase contained within the insulating matrix phase. Successful bypass of the current from the anode 3 to the cathode 1 is also dependant on the presence of a continuous path of the voltage activated conductive phase from a first face of the bypass separator 2 to a second face of the bypass separator 2 and to good electrical contact with the two electrodes. It is also clear that the structure of the composite bypass separator 2, and in particular the microstructure of the voltage activated conductive phase within the bypass separator 2 is critical to its performance and properties.

Figure 2:
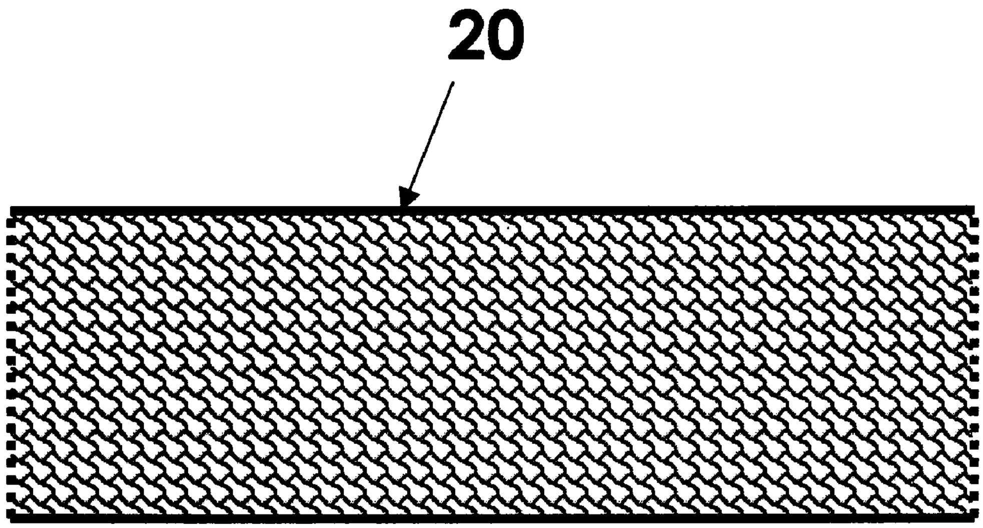
FIG. 2 is a schematic illustration of one embodiment of the composite micro-porous bypass separator in accordance with the invention where the separator comprises an essentially homogeneous mixture of the matrix phase and voltage activated conductive phase.
Figure 3:
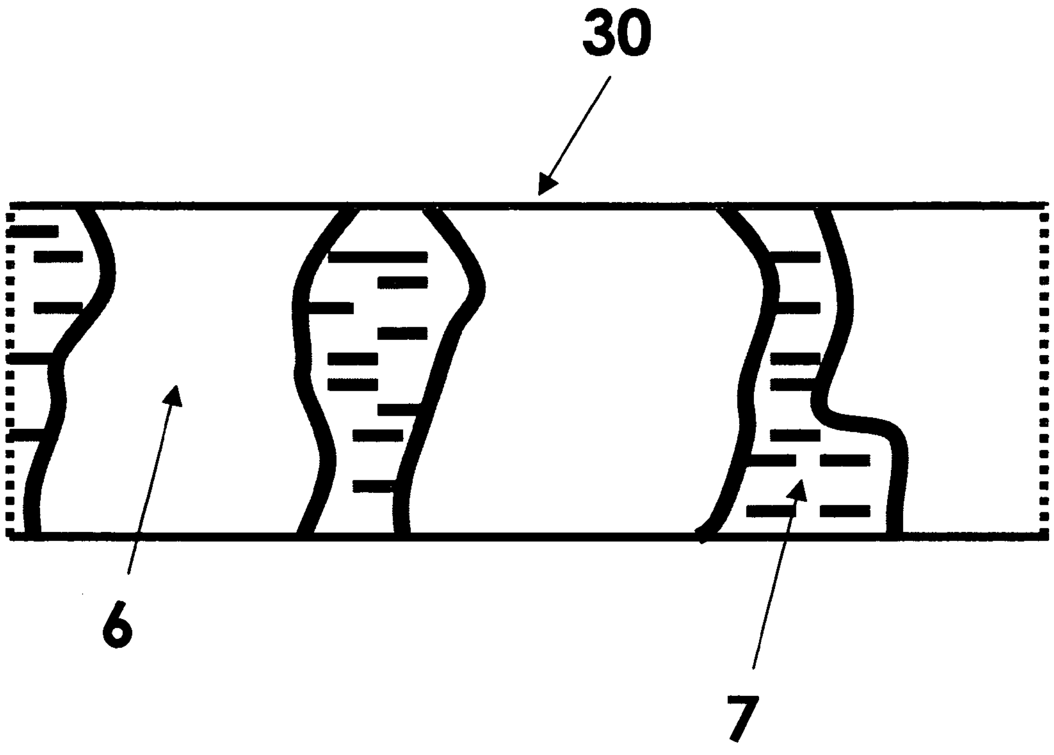
FIG. 3 is a schematic illustration of one embodiment of the composite micro-porous bypass separator in accordance with the invention where the separator comprises discrete domains of the matrix phase and the voltage activated conductive phase formed from a melt or solution upon cooling or drying.

The structure of the improved composite separator 2 of this invention is such that the voltage activated conductive phase is contained within the insulating matrix phase while providing a number of continuous current paths from the first face of the separator to the second face when the voltage activated conductive phase is in a conductive state. There are a number of embodiments of this invention that provide suitable bypass separator structures for handling electrical currents of a magnitude suitable for preventing overcharge in an electrochemical cell such as a Li-ion battery. In one embodiment, illustrated in FIG. 2, a composite microporous separator film 20 comprises a homogeneous mixture of the insulating matrix phase and the voltage activated conductive phase. This embodiment of the bypass separator 2 may be formed if both the insulating and the conductive phases melt during processing to form a homogeneous melt before film formation, or when both phases dissolve in a solvent to form a homogeneous solution before film formation. In another embodiment, illustrated in FIG. 3, a composite microporous separator film 30 comprises a non-homogeneous mixture in which the matrix phase 6 and the voltage activated conductive phase 7 are phase separated. In this case, the voltage activated conductive phase 7 forms a network within the insulating matrix phase 6. Such a structure may be formed if the two phases comprising the bypass separator 2 do not mix completely during processing or if they phase separate during cooling of the extruded or cast film.

Figure 4:
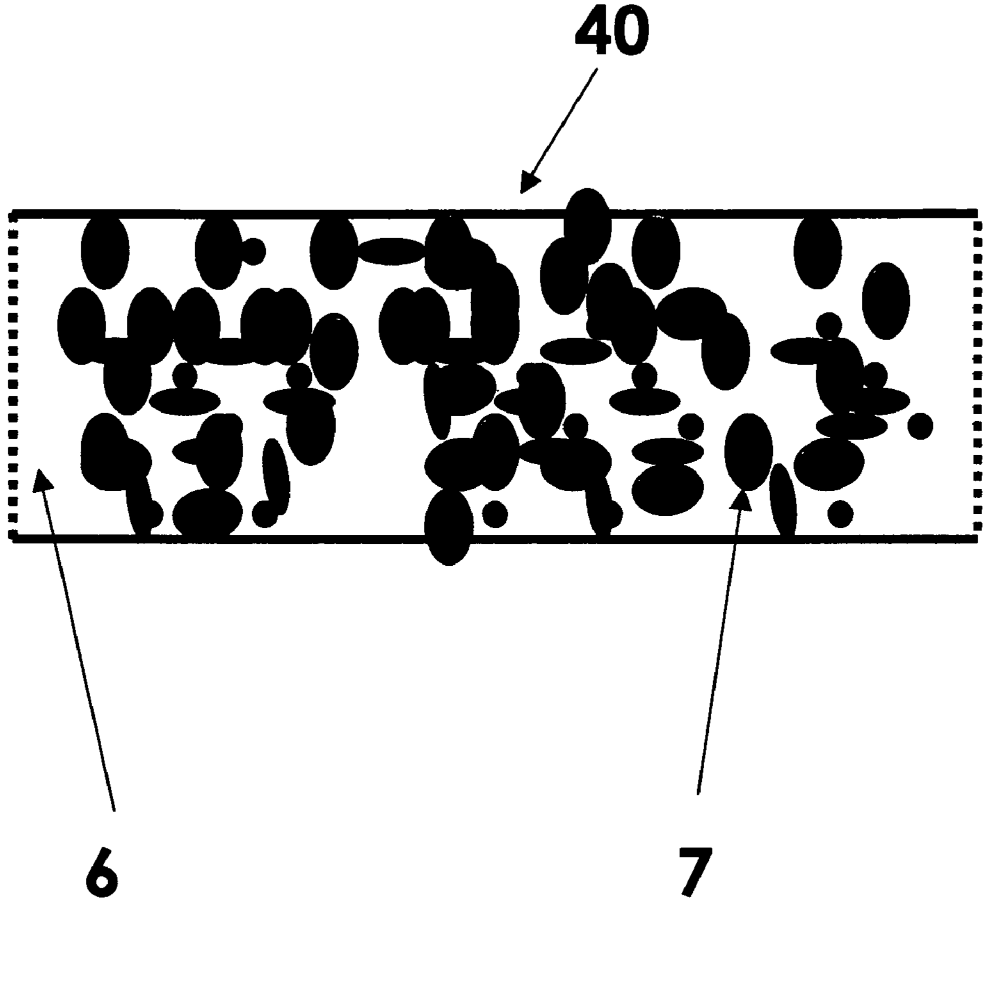
FIG. 4 is a schematic illustration of one embodiment of the composite micro-porous bypass separator in accordance with the invention wherein the separator comprises the matrix phase and discrete particles of the voltage activated conductive phase formed when the conductive phase does not melt or is otherwise insoluble in the matrix phase during processing.
Figure 5:
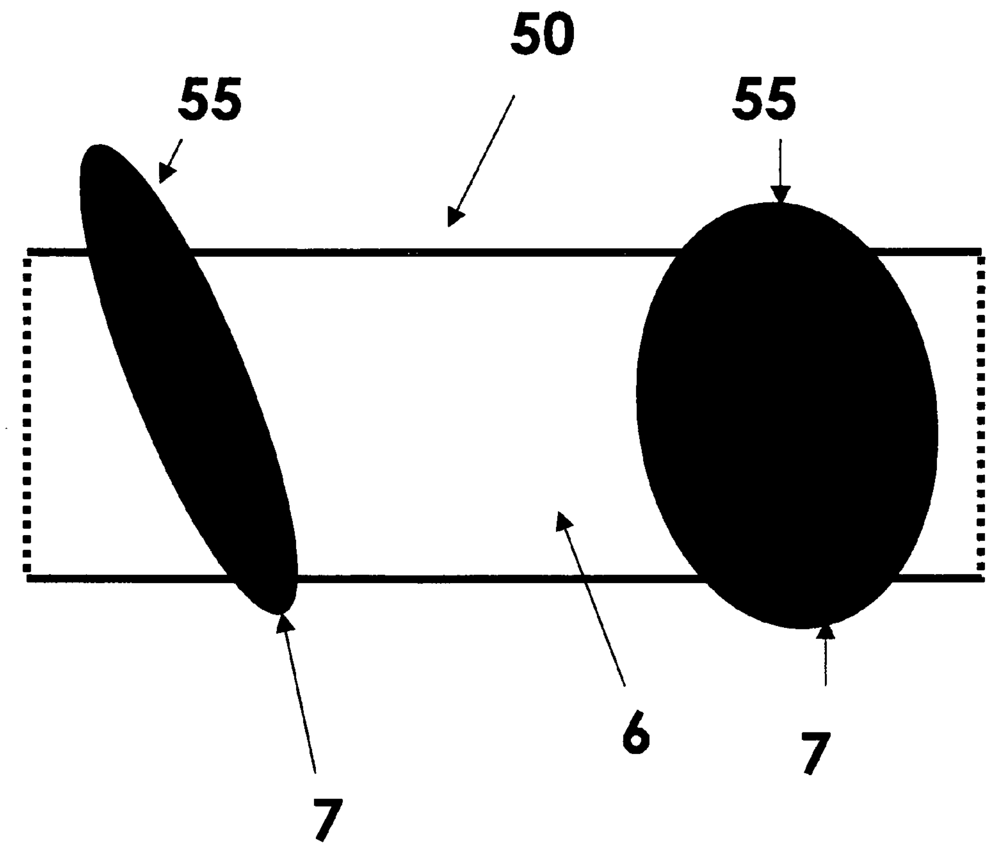
FIG. 5 is a schematic illustration of one embodiment of the composite micro-porous bypass separator in accordance with the invention wherein the separator comprises the matrix phase and discrete particles of the voltage activated conductive phase formed when the conductive phase does not melt or is otherwise insoluble in the matrix phase during processing. In this embodiment the conductive phase particles are large relative to the thickness of the separator and are preferably rod shaped.

FIG. 4 illustrates another embodiment of this invention in which the matrix phase 6 and the voltage activated conductive phase 7 are phase separated in a composite microporous separator film 40. In this structure the voltage activated conductive phase 7 comprises solid particles of material that undergo little or no dissolution or melting during processing. Thus the voltage activated conductive phase 7 exists as solid particles within the matrix phase 6 at all points as the bypass separator 2 is made. Such a composite separator structure may be formed if the voltage activated phase 7 has a significantly higher melting point than the matrix phase 6 or if the voltage activated phase 7 has much less solubility in the mixing solvent than the matrix phase 6. Finally, FIG. 5 illustrates a preferred embodiment of an improved composite bypass separator film 50 in which the voltage activated conductive phase 7 comprises particles 55 wherein at least one dimension has an average length whose size is essentially equivalent or greater than the final thickness of the microporous separator 2. Such a structure leads to a higher incidence of the formation of a continuous conductive path between the anode 3 and the cathode 1 and as such can handle a greater bypass current by avoiding contact resistances associated with conduction through multiple conductive particle interfaces. This bypass separator structure may be formed by selecting particles of the voltage activated conductive phase 7 of a specific size for mixing with the matrix phase 6 before film formation. A preferred morphology of the voltage activated conductive phase particles in this embodiment of the bypass separator structure is fiber-like with a diameter less than half the length of the fiber particle.

Figure 6:
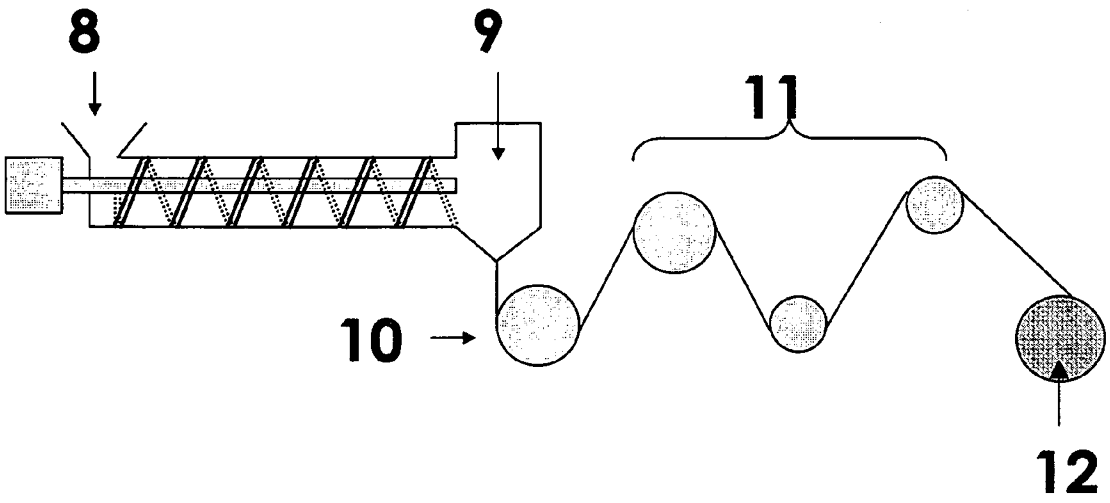
FIG. 6 is a schematic illustration of one embodiment of a process for making the composite bypass separator in accordance with the invention wherein the matrix phase and conductive phase materials are mixed and placed into a screw extruder for further mixing before being extruded through a die to form a film for further processing and pore generation.

In another aspect of this invention a method of making an improved composite bypass separator specifically involves a premixing step in which both the insulating matrix phase 6 and the voltage activated conductive phase 7 are mixed prior to film formation and pore generation. A pore generating material may also be mixed with the matrix and conductive phases. A pore generating material may be selected from either organic fillers such as wax or inorganic fillers such as water-soluble salts with particle sizes of less than 5 μm. FIG. 6 provides an illustration of one embodiment of the method for making an improved composite bypass separator. The first step in the method involves mixing the matrix phase 6 and the conductive phase 7 in a step 8. In one embodiment the two phases are mixed as a melt or solution, wherein both phases effectively melt or dissolve to form a homogeneous mixture. The mixing temperature may be in the range of 100° C.-300° C. In another embodiment the two phases are mixed as a melt or solution, wherein only the matrix phase 6 melts or is soluble and the conductive phase 7 does not melt or is not soluble resulting in the formation of a non-homogeneous mixture. In one embodiment, the matrix phase and conductive phase materials may be premixed in a separate vessel, or placed roughly mixed into an extruder 8 for further mixing.

The next step of the method may involve extrusion of the mixture through a die in a step 9 to form a film, which may be cooled on a cooling drum in a step 10. In another embodiment the mixture may be cast from solution to form a film. The film may be further stretched on rollers in a step 11 or film blown to achieve a desired film thickness before being collected onto a roller in a step 12. The next step in the method of this invention involves the generation of micropores in the composite film. In one embodiment, the pores may be generated by extraction of the pore forming phase from the composite film using a solvent extraction process. In this method it is a requirement that the voltage activated conductive phase 7 is not extracted during the process and thus proper selection of the pore generating material and extraction process is critical. In another embodiment of the invention the pores may be generated by a dry stretch process. The final step in the method may involve an annealing process to stabilize the microporous composite film.

Various parameters of the method of this invention may be controlled to determine the final structure of the composite bypass separator film. In one aspect, the structure may be controlled through the choice of how the two phases are mixed. For example, the melting point of the conductive polymer poly(2-butylthiophene) (P3BT) is ~250° C. as compared to a polyethylene matrix phase which melts ~150° C.-170° C. Thus to achieve a relatively homogeneous film the mixture may be heated above 250° C. during mixing. Such a film can be used to create a bypass separator 2 with the structure illustrated in FIG. 2 or FIG. 3. If the mixing temperature for the same materials is below 250° C. but above 170° C. a heterogeneous film may be formed wherein the unmelted conductive polymer particles are suspended in the polyethylene matrix phase as is illustrated in FIG. 4 and FIG. 5. In forming the heterogeneous films the size, shape and morphology of the conductive phase particles 7 can be selected to maximize the bypass current capability of the bypass separator relative to the amount of conductive phase added.

Accordingly, there are several objects and advantages of the composite voltage activated conductive bypass separator 2 and the method for producing it. One such advantage is that the bulk of the conductive phase in the composite bypass separator of this invention is located within the separator film and not on the surface of the film as is the case for the coated bypass separators representing the current state of the art. Thus the cross-sectional area of the electrical current path from separator face to separator face can be maximized relative to the amount of conductive phase 7 in the bypass separator 2. As a result, the bypass current density capability of the bypass separator 2 of this invention may be maximized relative to the loading of the voltage activated conductive phase 7 leading to either cost savings, because of the often significantly greater cost of the conductive polymer phase relative to the matrix phase, or to greater bypass current capability per unit area of separator. Another advantage of having the conductive phase 7 intimately mixed with the matrix phase 6 within the bypass separator 2 is the potential for increasing the stability and durability of the conductive phase 7 in an electrochemical cell environment. Such a structure can mitigate issues related to the solubility, reactivity, or adhesion of the voltage activated conductive phase 7 to the separator by providing a framework for its support thus increasing the useful life of the bypass separator 2. A further advantage of the composite separator 2 of this invention is that the voltage activated conductive phase 7 does not reside specifically within the pores of the bypass separator 2 and thus does not negatively affect the porosity of the bypass separator 2. Thus the improved composite bypass separator 2 of this invention may have lower impedance than those made by the coating method.

The method of this invention also provides numerous advantages over the current state of the art. One advantage is the much greater flexibility in the choice and tailoring of the properties of the voltage activated conductive phase 7. For example, the voltage activated conductive phase 7 does not need to be soluble in any solvent because it can be incorporated into the bypass separator 2 as solid particles by the method of this invention. This allows the use of heavily crosslinked conductive polymers or inorganic self-switching materials, which may exhibit greater long-term stability and durability in an electrochemical cell relative to un-crosslinked, lower molecular weight coatable polymers. The method of this invention is also cost effective by eliminating the necessity of a secondary polymer coating process, which typically requires the use of a large volume of polar solvents that can be difficult and costly to handle on a large scale. The method is compatible with already existing separator manufacturing equipment and processes, limiting the need for large capital investment and allowing much greater control over the final structure of the bypass separator material. Finally, the bypass separator 2 of this invention is fully interchangeable with conventional separators and can thus be easily introduced into the current Li-ion battery systems.

It must be emphasized that the example below is merely illustrative of specific embodiments of the invention and is not intended as an undue limitation on the generally broad scope of the invention.

Example 1

A bypass separator was made by dry mixing polyethylene polymer and poly(3-octyl thiophene) (P3OT) in a ratio of (85:15) by weight. The conductive onset voltage for P3OT is approximately 3.9 V. The polymer mixture was then mixed in a melt of 70% paraffin by weight. The polymers were mixed by stirring at a temperature of ~120° C. until a uniform melt was formed. The mixture was cooled slightly and allowed to harden before it was placed into a hot press and compressed into a film. The film was cooled to room temperature and then placed into a hot cyclohexane solution to extract the paraffin, producing a porous polymeric film that was approximately 40 um thick.

Figure 7:
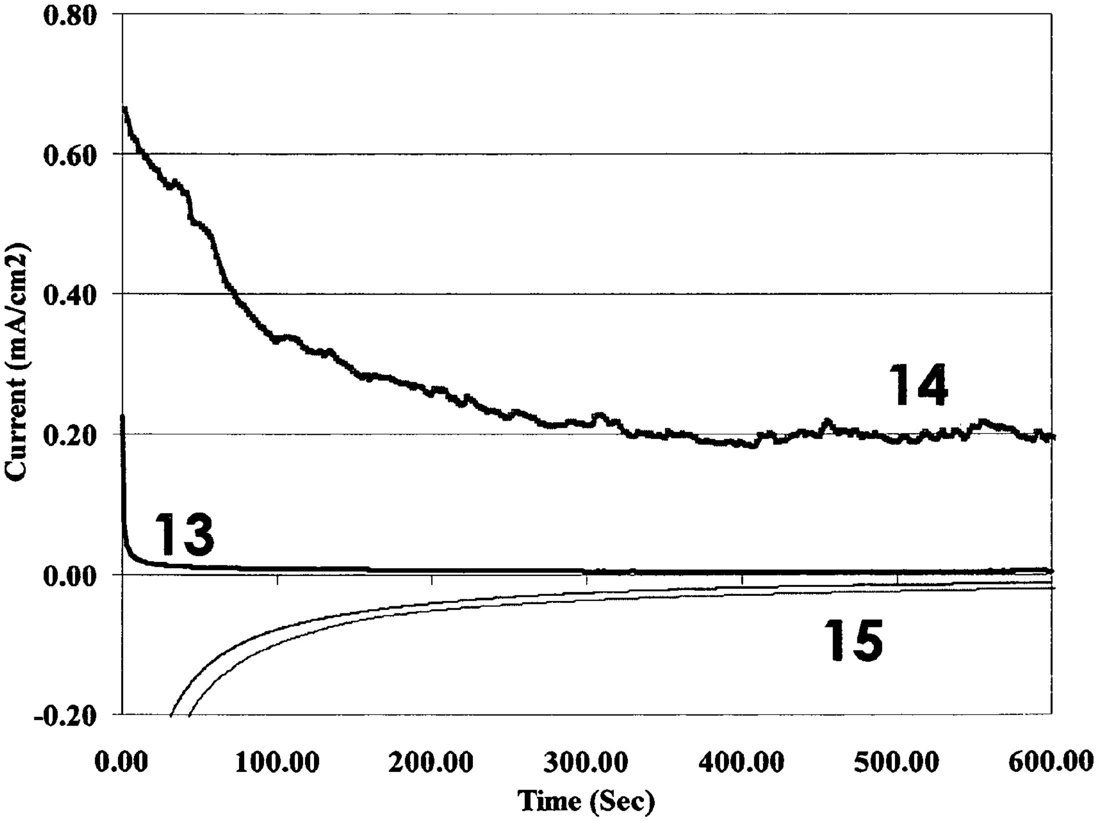
FIG. 7 is a graphical representation showing the bypass current density vs. time comparing a conventional separator and one embodiment of the composite bypass separator in accordance with the invention.

The bypass current of the composite microporous bypass separator was evaluated in a coin cell with the following configuration: Spring/Stainless Steel Spacer/Lithium Metal/Separator/Stainless Steel Spacer. The electrolyte was EC:DEC 1:1 with 1 M $LiPF_6$. The cells were polarized to 4.5 V (vs. the Lithium anode) for ~15 minutes and the bypass current monitored. After the initial oxidation of the polymer, a steady state bypass current would be established. The magnitude of the current was taken to be a rough indicator of the maximum bypass current capability of the bypass separator at that voltage. FIG. 7 shows the area specific bypass current vs. time for a control cell using a conventional separator as compared to a cell using a P3OT based bypass separator. Upon polarizing to 4.5 V, a steady state bypass current of 0.2 $mA/cm^2$ was observed for the cell containing the P3OT based composite bypass separator 14, while the current for the control cell was effectively 0 $mA/cm^2$ 13. Subsequently when polarized to 1.0 V both cells behaved in a similar manner 15 and there was no indication of a bypass current as would be expected if the bypass separator had become insulating.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A microporous separator film for electrochemical cells comprising:

an intimate mixture of an electrically insulating matrix phase and a self-switching voltage activated conductive phase, wherein the intimate mixture comprises a melt or solution to effectively contain the self switching voltage activated conductive phase within the insulating matrix phase and the insulating matrix phase and the self-switching voltage activated conductive phase to form a mixture of discrete, isolated phase regions which are formed by phase separated mixtures, and wherein the microporous separator film is unobstructed to promote ionic conductivity in the electrochemical cells; and wherein the voltage activated conductive phase provides a plurality of conductive paths from a first face of the microporous separator film to a second face of the microporous separator film; and wherein the microporous separator film has a porosity that is physically separate from the voltage activated conductive phase.

2. The microporous separator film of claim 1, wherein the electrically insulating matrix phase is selected from the group consisting of polyolefins, polysulfones, polyvinylchloride, polyvinylfluoride, polytetrafluoroethylene polypropylene copolymer, polyamide, cellulose and polycarbonate or combinations thereof; and wherein porosity is formed after the voltage activated conductive phase and non-conductive components are intimately mixed such that the voltage activated conductive phase is separate from the porosity of the microporous separator film.

3. The microporous separator film of claim 1, wherein the electrically insulating matrix phase comprises polyethylene.

4. The microporous separator film of claim 1, wherein the electrically insulating matrix phase comprises polypropylene.

5. The microporous separator film of claim 1, wherein the electrically insulating matrix phase comprises a combination of polyethylene and polypropylene.

6. The microporous separator film of claim 1, wherein the self-switching voltage activated conductive phase is selected from the group consisting of polythiophene, polypyrrole, polyfluorene, polybenzene, Silicon, GaAs, and their derivatives.

7. The microporous separator film of claim 1, wherein the self-switching voltage activated conductive phase is a voltage activated conductive polymer.

8. The microporous separator film of claim 7, wherein the intimate mixture comprises between 0.01 and 50 weight percentage voltage activated conductive polymer.

9. The microporous separator film of claim 1, wherein the self-switching voltage activated conductive phase is an essentially insoluble crosslinked voltage activated conductive polymer.

10. The microporous separator film of claim 1, wherein the self-switching voltage activated conductive phase comprises a rod shaped morphology in which the average diameter of a particle of the self-switching voltage activated conductive phase is less than one half the average length.

* * * * *